United States Patent
Saito

(10) Patent No.: US 9,557,035 B2
(45) Date of Patent: Jan. 31, 2017

(54) LIGHT FLUX CONTROLLING MEMBER, LIGHT EMITTING DEVICE AND ILLUMINATION APPARATUS

(71) Applicant: Enplas Corporation, Saitama (JP)

(72) Inventor: Tomohiro Saito, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 62 days.

(21) Appl. No.: 14/722,622

(22) Filed: May 27, 2015

(65) Prior Publication Data

US 2015/0345748 A1    Dec. 3, 2015

(30) Foreign Application Priority Data

May 30, 2014    (JP) .................................. 2014-112329

(51) Int. Cl.
| | | |
|---|---|---|
| *F21V 7/00* | (2006.01) | |
| *F21V 13/04* | (2006.01) | |
| *G02B 3/00* | (2006.01) | |
| *G03B 15/00* | (2006.01) | |
| *F21V 5/04* | (2006.01) | |
| *F21Y 101/00* | (2016.01) | |

(52) U.S. Cl.
CPC .................. *F21V 13/04* (2013.01); *G02B 3/00* (2013.01); *G03B 15/00* (2013.01); *F21V 5/045* (2013.01); *F21Y 2101/00* (2013.01)

(58) Field of Classification Search
CPC ............ F21V 5/005; F21V 5/045; F21V 7/22; G02B 19/0028; G02B 19/0061; G02B 3/08
USPC ................................................... 362/297, 309
See application file for complete search history.

(56) References Cited

U.S. PATENT DOCUMENTS

| | | | | |
|---|---|---|---|---|
| 2009/0180286 A1* | 7/2009 | Bamba | ..................... | F21V 5/045 362/297 |
| 2013/0155691 A1* | 6/2013 | Hsieh | ..................... | F21V 5/045 362/311.06 |

FOREIGN PATENT DOCUMENTS

JP    11-065490 A    3/1999

* cited by examiner

*Primary Examiner* — Andrew Coughlin
(74) *Attorney, Agent, or Firm* — Brundidge & Stanger, P.C.

(57) ABSTRACT

An incidence area of a light flux controlling member according to the present invention includes a fresnel lens part, an outermost lens part, and a reflector holding part. The fresnel lens part includes a first protrusion that has a first incidence surface, a first reflection surface, and a first ridge line. The outermost lens part includes a second protrusion that has a second incidence surface, and a second reflection surface. A reflector holding part holds a reflector.

9 Claims, 16 Drawing Sheets

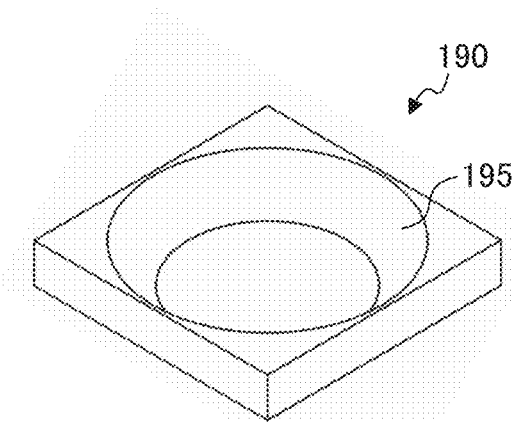
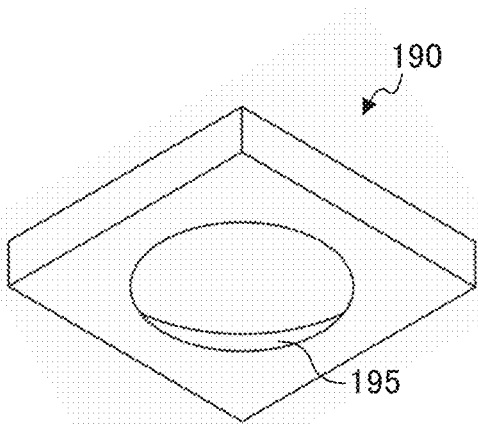
FIG. 7A   FIG. 7D
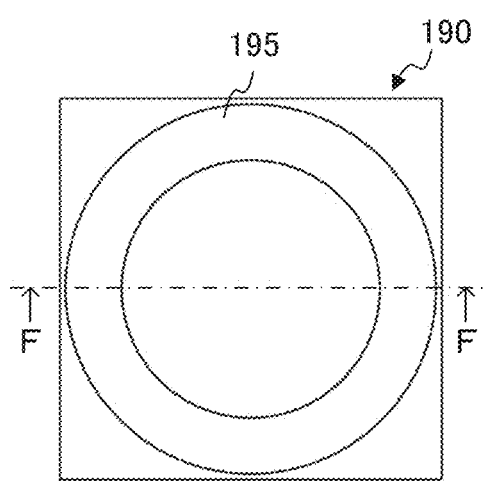
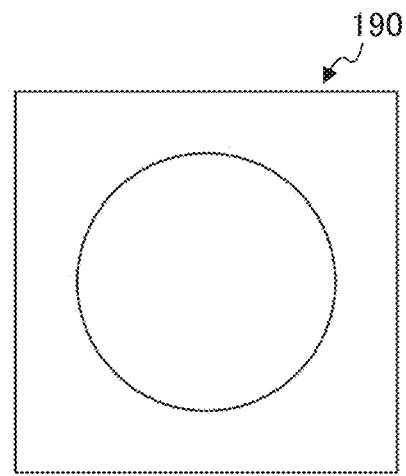
FIG. 7B   FIG. 7E
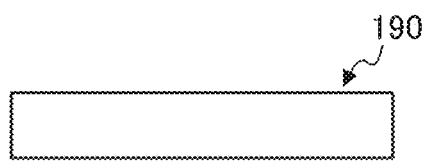
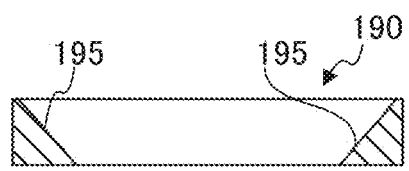
FIG. 7C   FIG. 7F

LIGHT FLUX CONTROLLING MEMBER, LIGHT EMITTING DEVICE AND ILLUMINATION APPARATUS

CROSS REFERENCE TO RELATED APPLICATIONS

This application is entitled to and claims the benefit of Japanese Patent Application No. 2014-112329, filed on May 30, 2014, the disclosure of which including the specification, drawings and abstract is incorporated herein by reference in its entirety.

TECHNICAL FIELD

The present invention relates to a light flux controlling member that controls the distribution of light emitted from a light emitting element. In addition, the present invention relates to a light emitting device and an illumination apparatus that have the light flux controlling member.

BACKGROUND ART

In recent years, from the viewpoints of energy conservation and miniaturization, light emitting devices using light emitting diodes (hereinafter also referred to as "LED") as light sources, (LED flashes), have been used as light emitting devices for imaging cameras. As the light emitting devices described above, a light emitting device in which an LED and a fresnel lens are combined is well known.

Typically, the shape of an imaging area of an imaging camera is quadrangular. Therefore, in order to obtain a sharp captured image, the light emitting device preferably illuminates an area to be irradiated quadrangularly. Therefore, a fresnel lens to be used for the light emitting device for an imaging camera is required to uniformly and efficiently irradiate the quadrangular area to be irradiated with light emitted from a light emitting element. Also to date, various fresnel lenses have been proposed for illuminating a quadrangular area to be irradiated (see, e.g., PTL 1).

FIG. 1A is a perspective view of fresnel lens 10 disclosed in PTL 1. Fresnel lens 10 illustrated in FIG. 1A can perform the same function as that of cylindrical lens 20 illustrated in FIG. 1B. As illustrated in FIG. 1A, fresnel lens 10 disclosed in PTL 1 includes a plurality of concentric grooves 12 whose shape in plan view is rectangular which are spaced apart from each other.

CITATION LIST

Patent Literature

PTL 1
Japanese Patent Application Laid-Open No. 11-065490

SUMMARY OF INVENTION

Technical Problem

However, when the quadrangular area to be irradiated is irradiated with light using the fresnel lens disclosed in PTL 1, the quadrangular area to be irradiated cannot be sufficiently irradiated with light emitted from the light emitting element uniformly and efficiently, and thus the fresnel lens of PTL 1 has room for improvement.

An object of the present invention is to provide a light flux controlling member capable of uniformly and efficiently irradiating a quadrangular area to be irradiated with light emitted from a light emitting element. Another object of the present invention is to provide a light emitting device and an illumination apparatus that have the light flux controlling member.

Solution to Problem

In order to achieve the above-mentioned objects, a light flux controlling member of the present invention is a light flux controlling member that controls a distribution of light emitted from a light emitting element, including: an incidence area configured to receive light emitted from the light emitting element; and an emission area formed opposite to the incidence area and configured to emit light incident on the incidence area, wherein the incidence area includes: a fresnel lens part including a plurality of first protrusions, each having a first incidence surface configured to receive a part of the light emitted from the light emitting element, a first reflection surface formed to make a pair with the first incidence surface and configured to reflect light incident on the first incidence surface toward the emission area, and a first ridge line disposed between the first incidence surface and the first reflection surface and configured to connect two adjacent diagonal lines of a first virtual quadrangle; an outermost lens part including four second protrusions, each having a second incidence surface configured to receive another part of the light emitted from the light emitting element, and a second reflection surface formed to make a pair with the second incidence surface and configured to reflect light incident on the second incidence surface toward the emission area, each second protrusion being disposed on each side of a second virtual quadrangle disposed outside the first virtual quadrangle, and a third incidence surface disposed at each of four corners of the second virtual quadrangle and configured to receive a part of a rest of the light emitted from the light emitting element; and a reflector holding part for holding reflectors disposed at least at four corners of the second virtual quadrangle, the first virtual quadrangle and the second virtual quadrangle are disposed to be similar to and concentric with each other and to have their respective sides parallel to each other, and the incidence area has 2-fold symmetry or 4-fold symmetry about a center of the first virtual quadrangle and the second virtual quadrangle, as a rotation axis.

A light emitting device of the present invention has a light emitting element and a light flux controlling member of the present invention, wherein the light flux controlling member is disposed such that a central axis of the light flux controlling member coincides with an optical axis of the light emitting element.

An illumination apparatus of the present invention includes a light emitting device of the present invention, and a cover configured to transmit light emitted from the light emitting device while diffusing the emitted light.

Advantageous Effects of Invention

The light emitting device and the illumination apparatus that have the light flux controlling member of the present invention can irradiate a quadrangular area to be irradiated with light more uniformly and efficiently than a light emitting device and an illumination apparatus that have a conventional light flux controlling member.

BRIEF DESCRIPTION OF DRAWINGS

FIGS. 7A to 7F illustrate a configuration of a reflector according to Embodiment 1;

DESCRIPTION OF EMBODIMENTS

Hereinafter, embodiments of the present invention will be described in detail with reference to the accompanying drawings.

Embodiment 1

Configurations of Light Flux Controlling Member and Light Emitting Device

Figure 1A:
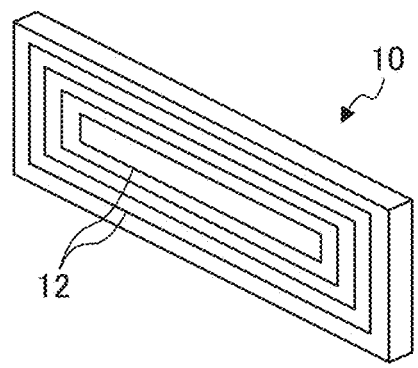
FIGS. 1A and 1B illustrate a configuration of a fresnel lens disclosed in PTL 1.
Figure 1B:
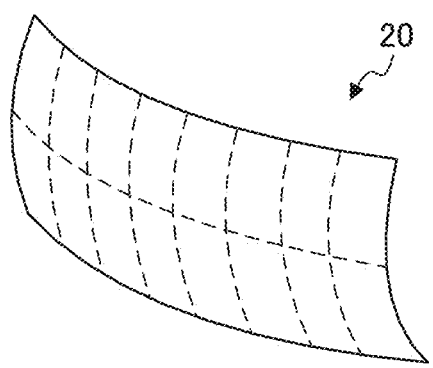
Figure 2:
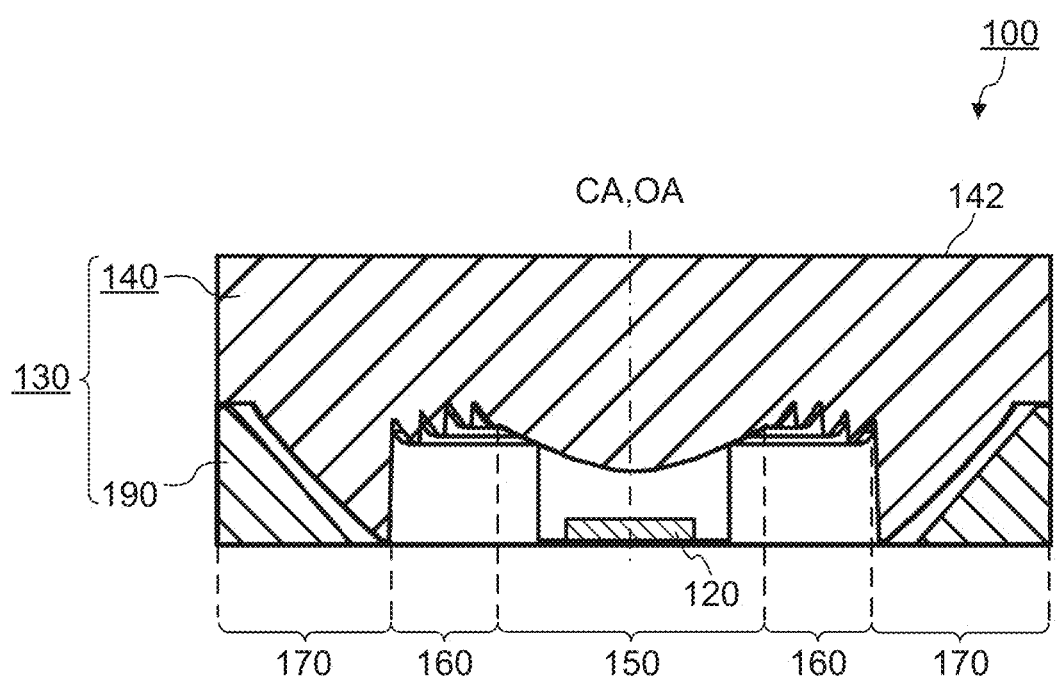
FIG. 2 is a sectional view of a light emitting device according to Embodiment 1.

FIG. 2 is a sectional view of light emitting device 100 according to Embodiment 1 of the present invention. As illustrated in FIG. 2, light emitting device 100 includes light emitting element 120 and light flux controlling member 130.

Light emitting element 120 is a light source of light emitting device 100, and is mounted on a substrate. Light emitting element 120 is, for example, a light emitting diode (LED) such as a white light emitting diode.

Light flux controlling member 130 controls the distribution of light emitted from light emitting element 120. Light flux controlling member 130 is disposed such that its central axis CA coincides with optical axis OA of light emitting element 120. It is noted that both of an incidence surface and an emission surface of light flux controlling member 130 to be described later have 2-fold symmetry or 4-fold symmetry, and their rotation axes coincide with each other. The rotation axis of each of the incidence surface and the emission surface is referred to as "central axis CA of light flux controlling member (body)." The term "optical axis OA of light emitting element" means a central beam of three-dimensional light flux emitted from light emitting element 120. Light flux controlling member 130 includes light flux controlling member body 140 and reflector 190. Light flux controlling member body 140 is used in combination with reflector 190.

Figure 3A:
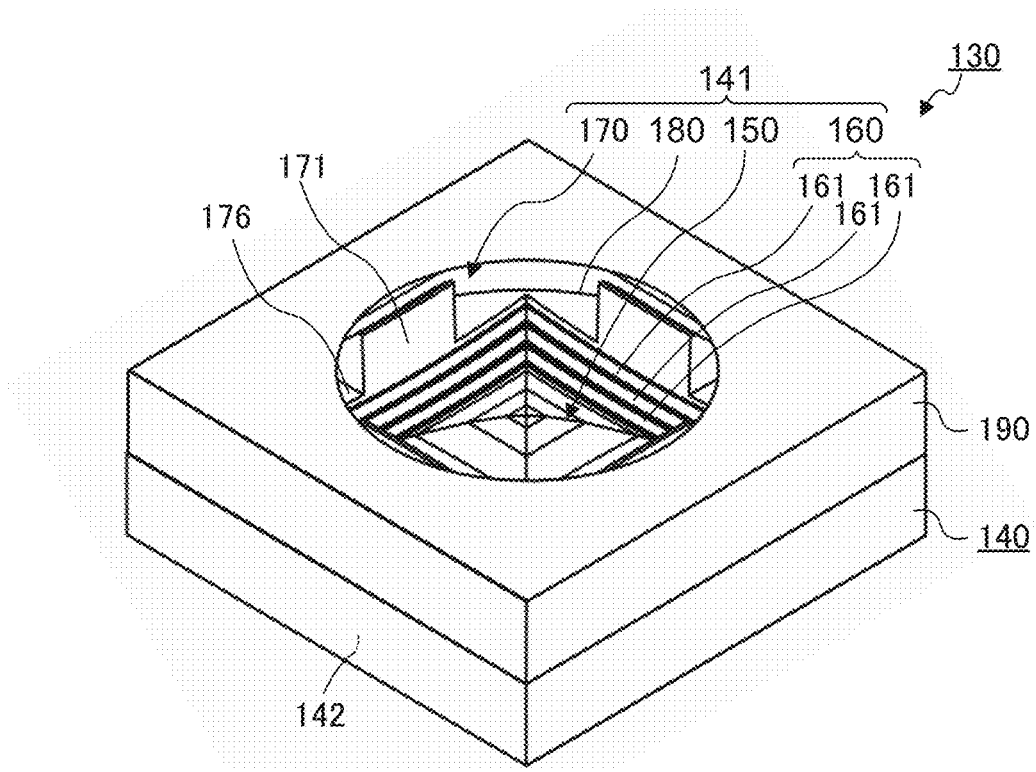
FIG. 3A is a perspective view of a light flux controlling member according to Embodiment 1.
Figure 4A:
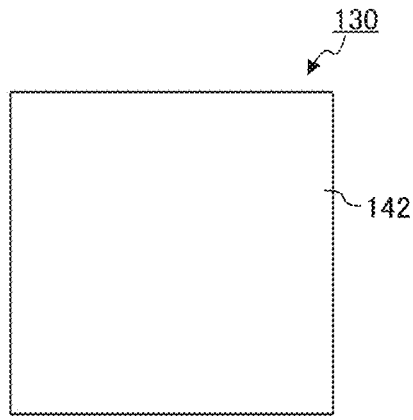
FIGS. 4A to 4C illustrate a configuration of the light flux controlling member according to Embodiment 1.
Figure 4D:
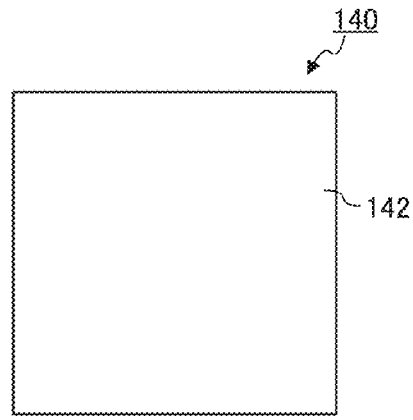
FIGS. 4D to 4F illustrate a configuration of the light flux controlling member body according to Embodiment 1.
Figure 4B:
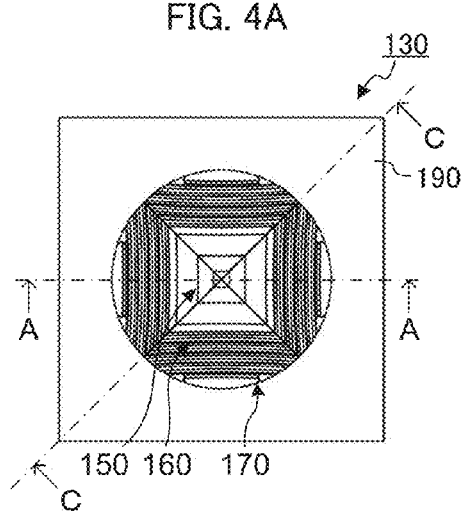
Figure 4E:
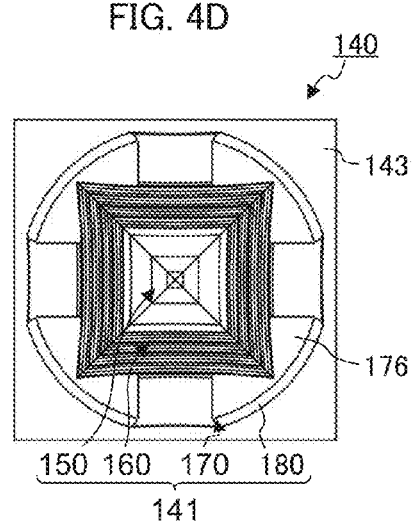
Figure 4C:
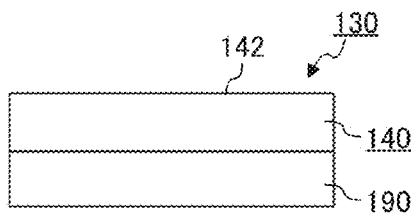
Figure 4F:
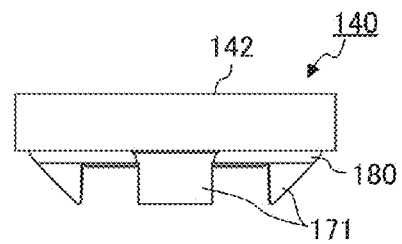
Figure 5A:
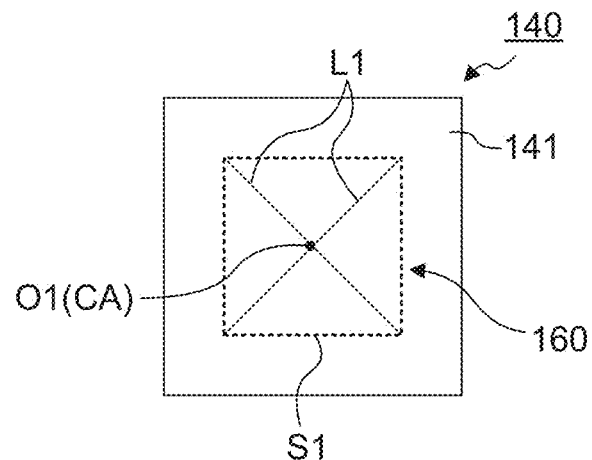
FIGS. 5A and 5B are bottom views of the light flux controlling member according to Embodiment 1, with a refraction part, a fresnel lens part, an outermost lens part and a reflector holding part being omitted.
Figure 5B:
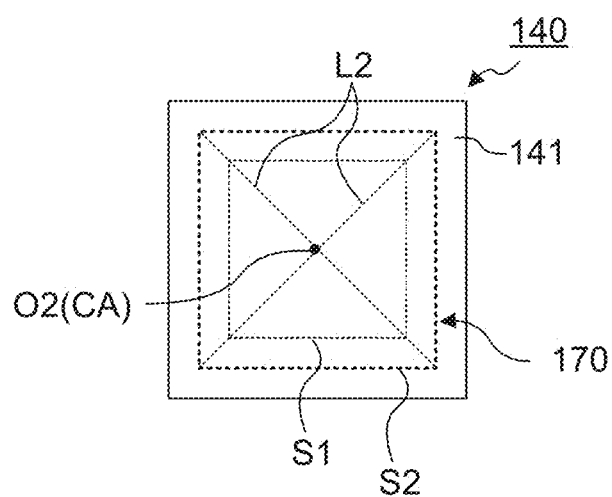
Figure 6A:
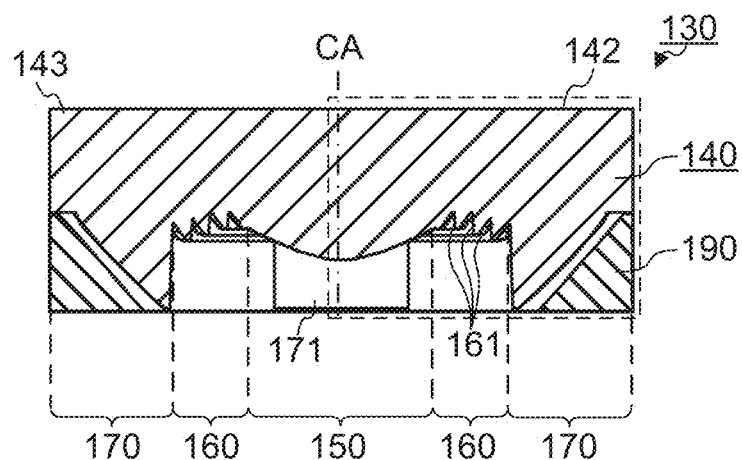
FIGS. 6A to 6C are sectional views of the light flux controlling member according to Embodiment 1.
Figure 6B:
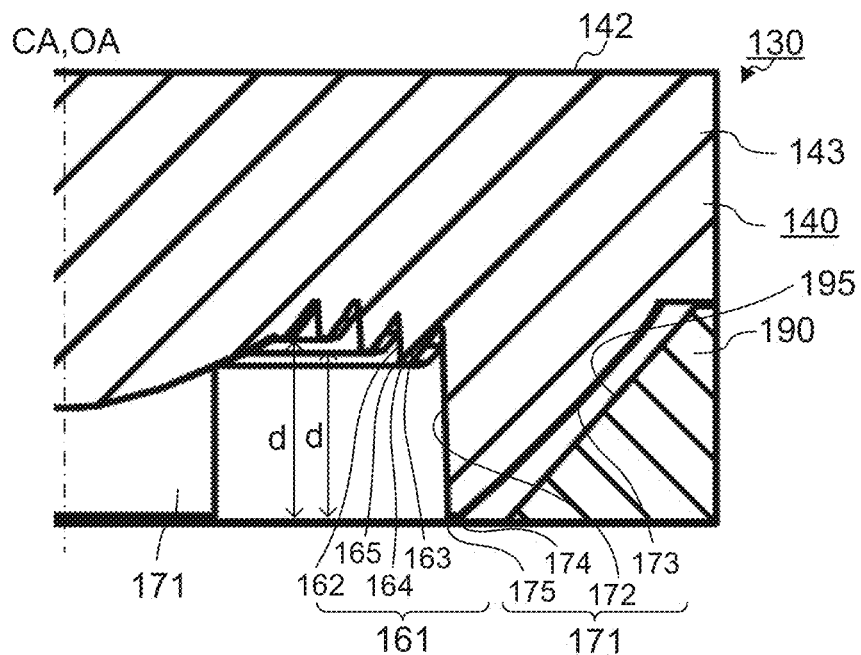
Figure 6C:
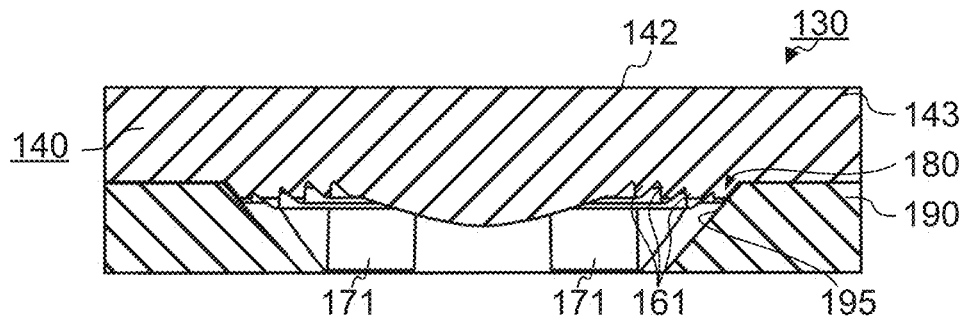

FIGS. 3A to 6C illustrate a configuration of light flux controlling member 130 according to Embodiment 1. FIG. 3A is a perspective view of light flux controlling member 130 according to Embodiment 1, and FIG. 3B is a perspective view of light flux controlling member body 140. FIG. 4A is a plan view of light flux controlling member 130, FIG. 4B is a bottom view of light flux controlling member 130, FIG. 4C is a side view of light flux controlling member 130, FIG. 4D is a plan view of light flux controlling member body 140, FIG. 4E is a bottom view of light flux controlling member body 140, and FIG. 4F is a side view of light flux controlling member body 140. FIG. 5A is a bottom view of light flux controlling member body 140 with only first virtual quadrangle S1 being illustrated, and FIG. 5B is a bottom view of light flux controlling member body 140 with only first virtual quadrangle S1 and second virtual quadrangle S2 being illustrated. FIG. 6A is a sectional view taken along line A-A illustrated in FIG. 4B, FIG. 6B is a partially enlarged sectional view of an area indicated by a broken line in FIG. 6A, and FIG. 6C is a sectional view taken along line C-C illustrated in FIG. 4B.

As illustrated in FIGS. 2 to 6C, light flux controlling member body 140 includes incidence area 141 that receives light emitted from light emitting element 120, and emission area 142 that is disposed opposite to incidence area 141 and emits light having entered light flux controlling member body 140 through incidence area 141. Flange 143 may be provided between incidence area 141 and emission area 142.

The shape of light flux controlling member body 140 in plan view is not particularly limited. As illustrated in FIG. 4A, the shape of light flux controlling member body 140 according to the present embodiment in plan view is square. The length of each side of light flux controlling member body 140 according to the present embodiment is, for example, about 4.7 mm.

The material for light flux controlling member body 140 is not particularly limited insofar as the material can allow light of a desired wavelength to pass through. Examples of the material for light flux controlling member body 140 include optically transparent resins such as polymethylmethacrylate (PMMA), polycarbonate (PC) and epoxy resin (EP), and glass. Light flux controlling member body 140 can be manufactured, for example, by injection molding.

Incidence area 141 receives light emitted from light emitting element 120.

Incidence area 141 includes refraction part 150 positioned at the central portion of incidence area 141, fresnel lens part 160 positioned outside refraction part 150, outermost lens part 170 positioned outside fresnel lens part 160, and reflector holding part 180. Incidence area 141 has 2-fold symmetry or 4-fold symmetry about the center of first virtual quadrangle S1 and second virtual quadrangle S2 to be described later, as a rotation axis. This rotation axis coincides with central axis CA of light flux controlling member body 140 and with optical axis OA of light emitting element 120. Accordingly, incidence area 141 also has 2-fold symmetry or 4-fold symmetry about central axis CA of light flux controlling member body 140 and about optical axis OA of light emitting element 120, as a rotation axis. The outer shape of incidence area 141 is, for example, rectangular or square.

Figure 3B:
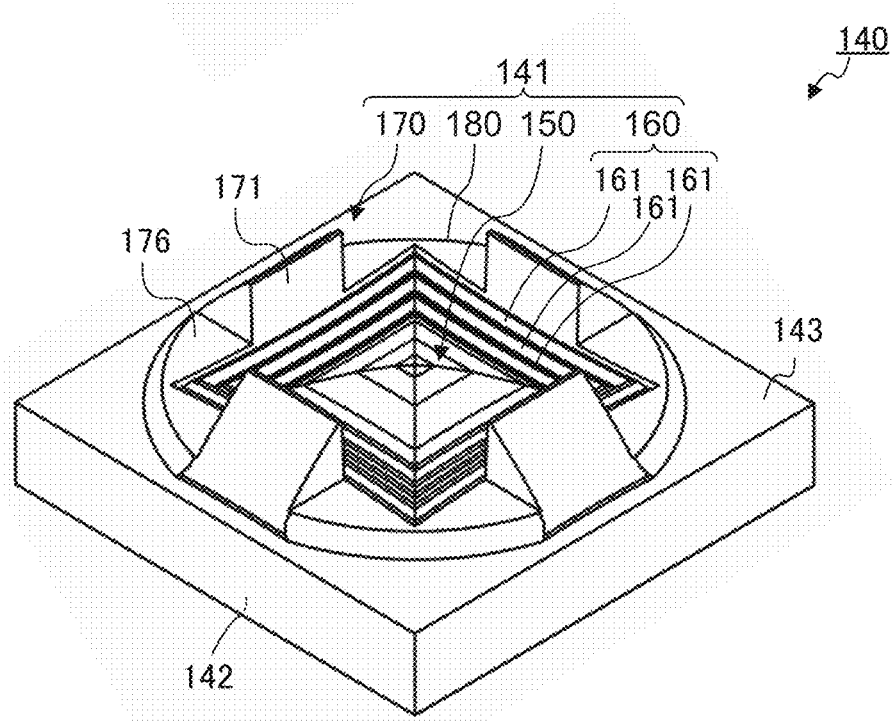
FIG. 3B is a perspective view of a light flux controlling member body according to Embodiment 1.

Refraction part 150 allows a part of light emitted (light emitted at a smaller angle relative to optical axis OA) from light emitting element 120 to enter light flux controlling member body 140, and refracts the incident light toward emission area 142. As illustrated in FIG. 2, refraction part 150 is disposed at a position facing light emitting element 120 to intersect central axis CA of light flux controlling member body 140 (optical axis OA of light emitting element 120). It is noted that the shape of refraction part 150 is not particularly limited insofar as refraction part 150 can exhibit the above-mentioned function. The shape of refraction part 150 may be, for example, a refractive fresnel lens. The surface of refraction part 150 may be spherical or aspherical. As illustrated in FIGS. 2 and 3B, in the present embodiment, the surface of refraction part 150 is aspherical, and refraction part 150 has a substantially quadrangular pyramidal shape.

Fresnel lens part 160 allows a part of light emitted (light emitted at a relatively large angle relative to optical axis OA) from light emitting element 120 to enter light flux controlling member body 140, and reflects the incident light toward emission area 142. Fresnel lens part 160 has a plurality of first protrusions 161 for controlling the traveling direction of the light emitted from light emitting element 120.

As illustrated in FIG. 5A, let us suppose that first virtual quadrangle S1 is disposed at fresnel lens part 160. Center O1 (intersection of first diagonal lines L1) of first virtual quadrangle S1 coincides with central axis CA of light flux controlling member body 140. First virtual quadrangle S1 and four first diagonal lines L1 constitute a reference with which to dispose a plurality of first protrusions 161. The plurality of first protrusions 161 is disposed to connect two adjacent first diagonal lines L1. The plurality of first protrusions 161 either may have a linear or curved shape. In addition, as illustrated in FIG. 6B, the plurality of first protrusions 161 is disposed such that a valley portion is formed between two adjacent first protrusions 161 in an area between two adjacent first diagonal lines L1.

The shape and the size of first protrusions 161 are not particularly limited; first protrusions 161 may have the same or different shapes and sizes. As illustrated in FIG. 6B, in the present embodiment, the plurality of first protrusions 161 has different sizes. In addition, distance d between the lower end portion of light flux controlling member body 140 and first ridge line 165 of each first protrusion 161 (distance d from the reference plane to first ridge line 165) in the direction of optical axis OA becomes gradually shorter as being outward from the inner side of first protrusion 161. Here, the term "lower end portion of light flux controlling member body 140" means the apex of second protrusion 171 (second ridge line 175) to be described later, and the term "reference plane" means a planar surface including the apex of second protrusion 171 (second ridge line 175).

As illustrated in FIG. 6B, first protrusion 161 has first incidence surface 162, first reflection surface 163, first connection surface 164, and first ridge line 165. In first protrusion 161, first incidence surface 162 is disposed inside (central axis CA side), and first reflection surface 163 is disposed outside.

First incidence surface 162 receives a part of light emitted from light emitting element 120, and refracts the part of the light toward first reflection surface 163. First incidence surface 162 either may be planar or curved. In the present embodiment, first incidence surface 162 is a curved surface. In addition, first incidence surface 162 either may be parallel to central axis CA (optical axis OA of light emitting element 120), or may incline relative to central axis CA. In the present embodiment, from the viewpoint of facilitating demolding, first incidence surface 162 inclines to be away from central axis CA as being closer to the lower end portion (reference plane) of light flux controlling member body 140. The inclining angle of first incidence surface 162 is preferably within a range of more than 0° and 10° or less relative to central axis CA in any cross-section including central axis CA. The inclining angle of first incidence surface 162 is preferably 5° or less, and more preferably 3° or less.

First reflection surface 163 is formed to make a pair with first incidence surface 162, and reflects light having entered light flux controlling member body 140 through first incidence surface 162 toward emission area 142. First reflection surface 163 either may be planar or curved. In the present embodiment, first reflection surface 163 is a curved surface. In addition, first reflection surface 163 inclines relative to central axis CA from the viewpoint of totally reflecting the light having reached first reflection surface 163. First reflection surface 163 inclines to be closer to central axis CA as being closer to the lower end portion (reference plane) of light flux controlling member body 140.

First connection surface 164 connects first incidence surface 162 to first reflection surface 163. First connection surface 164 either may be planar or curved. In the present embodiment, first connection surface 164 is a planar surface. In addition, first incidence surface 162 and first reflection surface 163 may be directly connected together without forming first connection surface 164.

First ridge line 165 is a boundary line between first incidence surface 162 and first connection surface 164. First ridge line 165 is disposed to connect two adjacent first diagonal lines L1 of first virtual quadrangle S1. It is noted that, when first connection surface 164 is not formed, first ridge line 165 is a boundary line between first incidence surface 162 and first reflection surface 163. When first connection surface 164 is provided between first incidence surface 162 and first reflection surface 163, the manufacturability can be enhanced by not forming an acute angle portion. When incidence area 141 is viewed in plan view, first ridge line 165 either may be a straight line, or may be a curve. In the present embodiment, when incidence area 141 is viewed in plan view, first ridge line 165 is a curve convex toward central axis CA.

Outermost lens part 170 allows a part of light emitted (light emitted at a larger angle relative to optical axis OA) from light emitting element 120 to enter light flux controlling member body 140, and reflects the incident light toward emission area 142. Outermost lens part 170 has four second protrusions 171 and four third incidence surfaces 176.

As illustrated in FIG. 5B, let us suppose that second virtual quadrangle S2 is disposed at outermost lens part 170. Center O2 (intersection of second diagonal lines L2) of second virtual quadrangle S2 coincides with central axis CA of light flux controlling member body 140. Second virtual quadrangle S2 constitutes a reference for disposing four second protrusions 171. Second virtual quadrangle S2 is disposed outside first virtual quadrangle S1. Second virtual quadrangle S2 and first virtual quadrangle S1 are disposed to be similar to and concentric with each other and to have their respective sides parallel to each other. As described above, first ridge line 165 is sufficient to be disposed to connect two adjacent first diagonal lines L1 of first virtual quadrangle S1. Therefore, first ridge line 165 and second ridge line 175 to be described later do not need to be parallel to each other since the two ridge lines sometimes may be formed to be curve.

Four second protrusions 171 are disposed on the respective sides of second virtual quadrangle S2. The sectional area of second protrusion 171 taken along a plane orthogonal to a side on which second protrusion 171 is disposed is larger than that of first protrusion 161. The length of second protrusion 171 in a direction parallel to the side of second virtual quadrangle S2 is shorter than the length of first protrusion 161 disposed outermost. When light flux controlling member body 140 is used for the above-mentioned light emitting device 100, the length of second protrusion 171 in the direction parallel to the side of second virtual quadrangle S2 is preferably longer than the width of light emitting element 120 to be used for light emitting device 100.

Second protrusion 171 is formed to have a substantially triangular prism shape. The sectional shape of second protrusion 171 taken along a plane orthogonal to the side on which second protrusion 171 is disposed is substantially triangular. As illustrated in FIG. 6B, each of second protrusions 171 has second incidence surface 172, second reflection surface 173, second connection surface 174, and second ridge line 175. In second protrusion 171, second incidence surface 172 is disposed inside (central axis CA side), and second reflection surface 173 is disposed outside.

Second incidence surface 172 receives light emitted from light emitting element 120, and refracts the light toward second reflection surface 173. Second incidence surface 172 either may be a planar surface, or may be a curved surface. In the present embodiment, second incidence surface 172 is a planar surface. In addition, second incidence surface 172 either may be parallel to central axis CA, or may incline relative to central axis CA. In the present embodiment, from the viewpoint of facilitating demolding, second incidence surface 172 inclines to be away from central axis CA as being closer to the lower end portion (reference plane) of light flux controlling member body 140.

Second reflection surface 173 is formed to make a pair with second incidence surface 172, and reflects light having entered light flux controlling member body 140 through second incidence surface 172 toward emission area 142. Second reflection surface 173 either may be a planar surface, or may be a curved surface. In the present embodiment, second reflection surface 173 is a curved surface. Second reflection surface 173 is a straight line in a cross-section orthogonal to central axis CA (horizontal cross-section). In addition, second reflection surface 173 is a curve convex outward in a cross-section including central axis CA (vertical cross-section).

Second connection surface 174 connects second incidence surface 172 to second reflection surface 173. Second connection surface 174 either may be a planar surface, or may be a curved surface. In the present embodiment, second connection surface 174 is a planar surface. In addition, second incidence surface 172 and second reflection surface 173 may be directly connected together without forming second connection surface 174.

Second ridge line 175 is a boundary line between second incidence surface 172 and second connection surface 174. It is noted that, when second connection surface 174 is not formed, second ridge line 175 is a boundary line between second incidence surface 172 and second reflection surface 173. Thus, when second connection surface 174 is provided between second incidence surface 172 and second reflection surface 173, the manufacturability can be enhanced by not forming an acute angle portion.

Four third incidence surfaces 176 receive a part of the rest of light (light not having entered light flux controlling member body 140 through refraction part 150, fresnel lens part 160 and second protrusion 171) emitted from light emitting element 120. Specifically, third incidence surface 176 receives light reflected at reflector 190 to be described later after having been emitted from light emitting element 120. Third incidence surface 176 either may be a planar surface, or may be a curved surface, and is appropriately set depending on the shape, the size, or the like of reflector holding part 180 to be described later. In the present embodiment, third incidence surface 176 is a planar surface. In addition, third incidence surface 176 is disposed at each of the four corners of second virtual quadrangle S2.

Reflector holding part 180 holds reflector 190 at a predetermined position. Reflector holding part 180 either may be formed to surround central axis CA of light flux controlling member body 140 about the entire circumference, or may be formed only at a part of the entire circumference. The shape, the size and the number of reflector holding part 180 are not particularly limited, insofar as reflector holding part 180 can hold reflector 190 at a predetermined position, and insofar as reflector holding part 180 does not affect the control of the distribution of light flux by light flux controlling member 130. For example, reflector holding part 180 is a convex part or a recess disposed between second protrusions 171 adjacent to each other, on flange 143, or the like. As illustrated in FIG. 3B, in the present embodiment, reflector holding part 180 has four step parts disposed respectively on the four corners of the second virtual quadrangle. Each step part is disposed outside third incidence surface 176. Therefore, light reflected at reflector 190 can enter light flux controlling member body 140 through third incidence surface 176. The height of the step part is, for example, about 0.1 to 0.3 mm.

Emission area 142 is formed opposite to incidence area 141 to emit light having entered light flux controlling member body 140 through incidence area 141. Emission area 142 is a planar surface or a curved surface formed on an area to be irradiated side, opposite to light emitting element 120. In the present embodiment, emission area 142 is a planar surface. As illustrated in FIGS. 2 and 6A and 6B, emission area 142 is formed to intersect central axis CA of light flux controlling member body 140. Emission area 142 emits light having entered light flux controlling member body 140 through refraction part 150, light having entered light flux controlling member body 140 through first incidence surface 162 and having been reflected at first reflection surface 163, light having entered light flux controlling member body 140 through second incidence surface 172 and having been reflected at second reflection surface 173, and light having been reflected at third reflection surface 195 of reflector 190 and having entered light flux controlling member body 140 through third incidence surface 176, toward the area to be irradiated.

Reflector 190 is held by reflector holding part 180. Reflector 190 reflects at least a part of light other than light having entered light flux controlling member body 140 through incidence area 141 (e.g., light having passed through a gap between second protrusions 171 adjacent to each other) after having been emitted from light emitting element 120 toward emission area 142. The light reflected at reflector 190 enters light flux controlling member body 140 mainly through third incidence surface 176.

FIGS. 7A to 7F illustrate the configuration of reflector 190 according to the present embodiment. FIG. 7A is a perspective view seen from above (from emission area 142), FIG. 7B is a plan view, FIG. 7C is a side view, FIG. 7D is a perspective view seen from below (from incidence area 141), FIG. 7E is a bottom view, and FIG. 7F is a sectional view taken along line F-F in FIG. 7B.

As illustrated in FIGS. 7A to 7F, reflector 190 has third reflection surface 195 that reflects a part of light other than light having entered light flux controlling member body 140 through incidence area 141 after having been emitted from light emitting element 120 toward emission area 142. Third reflection surface 195 particularly reflects light having passed through a gap between second protrusions 171 adjacent to each other toward emission area 142. The shape of reflector 190 in plan view is not particularly limited. As illustrated in FIG. 7B, the shape of reflector 190 according to the present embodiment in plan view is a square having a single through-hole. The length of each side of reflector 190 according to the present embodiment is, for example, about 4.7 mm. In addition, the inner surface of the through-hole of reflector 190 constitutes third reflection surface 195. That is, reflector 190 according to the present embodiment has single third reflection surface 195. The shape of the through-hole is not particularly limited insofar as the through-hole can exhibit the above-mentioned functions as third reflection surface 195. As illustrated in FIG. 7F, in the present embodiment, the shape of the through-hole is a truncated cone shape in which the diameter of the through-hole becomes continuously larger as being toward the opening on emission area 142 side away from the opening on incidence area 141 side. That is, single third reflection surface 195 is circular in a cross-section orthogonal to optical axis OA of light emitting element 120. The opening diameter of the through-hole on incidence area 141 side is, for example, about 3 to 5 mm. The opening diameter of the through-hole on emission area 142 side is, for example, about 4 to 6 mm. Third reflection surface 195 either may be formed to surround central axis CA of light flux controlling member body 140 about the entire circumference, or may be formed only at a part of the entire circumference. However, from the viewpoint of efficiently reflecting light other than light having entered light flux controlling member body 140 through incidence area 141 toward emission area 142, reflector 190 is disposed at least at the four corners of second virtual quadrangle S2. As illustrated in FIG. 6B, in the present embodiment, reflector 190 is disposed such that single third reflection surface 195 is outside second reflection surfaces 173 to surround optical axis OA (central axis CA of light flux controlling member body 140) of light emitting element 120.

The material for reflector 190 is not particularly limited insofar as reflector 190 can exhibit the above-mentioned functions. Examples of the material for reflector 190 include white resins such as epoxy resins, acrylic resins and silicone resins; and metals such as aluminum, silver, copper and alloys thereof. When using resin as a material for reflector 190, reflector 190 may be manufactured, for example, by injection molding. When using metal as a material for reflector 190, reflector 190 may be manufactured, for example, by press working. In addition, from the viewpoint of further reflecting light, a metal layer made of silver, aluminum, gold, copper, an alloy thereof, or the like may be disposed on third reflection surface 195 of reflector 190. The metal layer may be formed, for example, by vapor deposition method, sputtering method, or dip coating method. When the metal layer is disposed, the material for reflector 190 is not particularly limited, and may be an optically transparent resin, metal having lower reflectance, or the like.

(Simulation)

Light emitting device 100 having light flux controlling member 130 according to the above-described Embodiment 1 was simulated for its illuminance distribution. For comparison, each of a light emitting device not having light flux controlling member body 140 (only having light emitting element 120 and reflector 190), a light emitting device having a light flux controlling member not including second protrusion 171, and a light emitting device having light flux controlling member 130' in which light flux controlling member body 140' further has four corners 144' was simulated for its illuminance distribution.

Figure 8A:
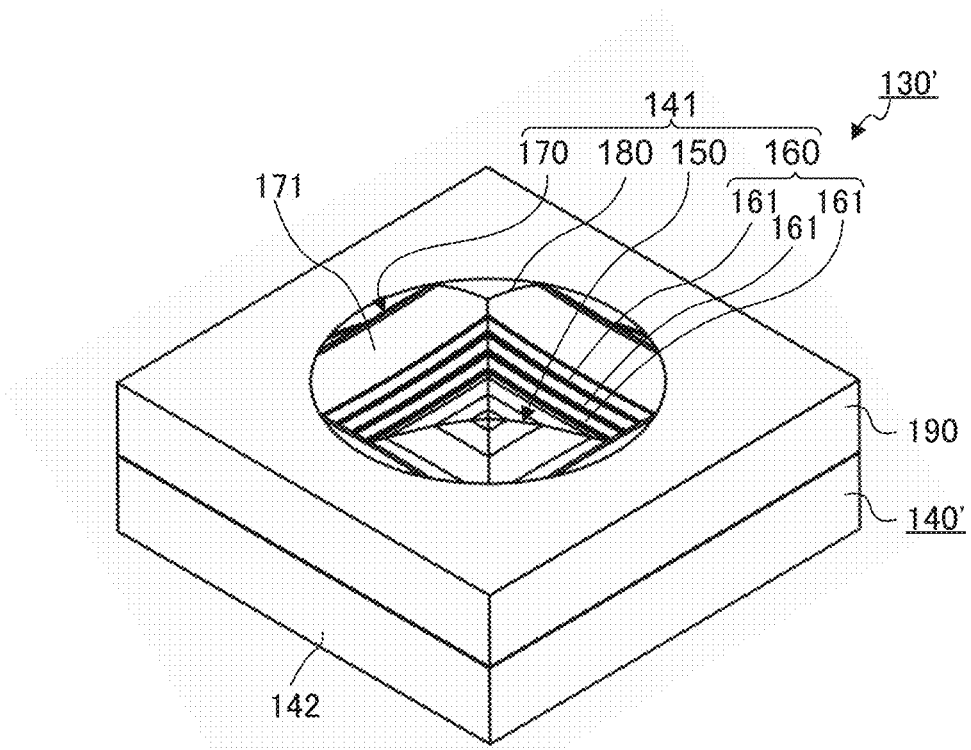
FIG. 8A is a perspective view of a comparative light flux controlling member.
Figure 10A:
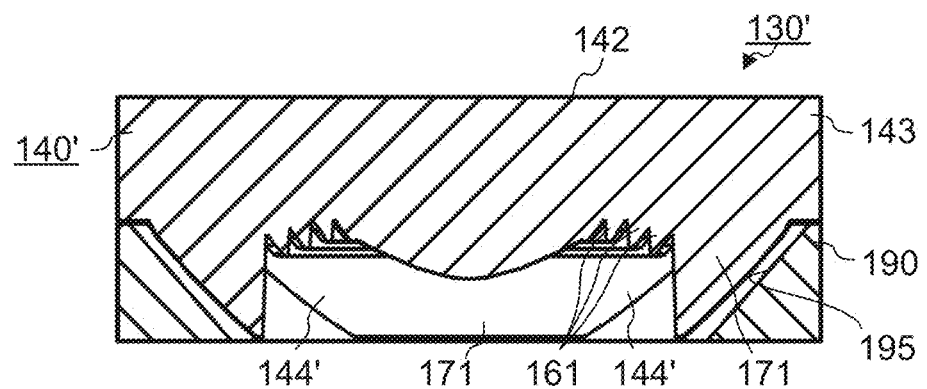
FIGS. 10A and 10B are sectional views of the comparative light flux controlling member.
Figure 10B:
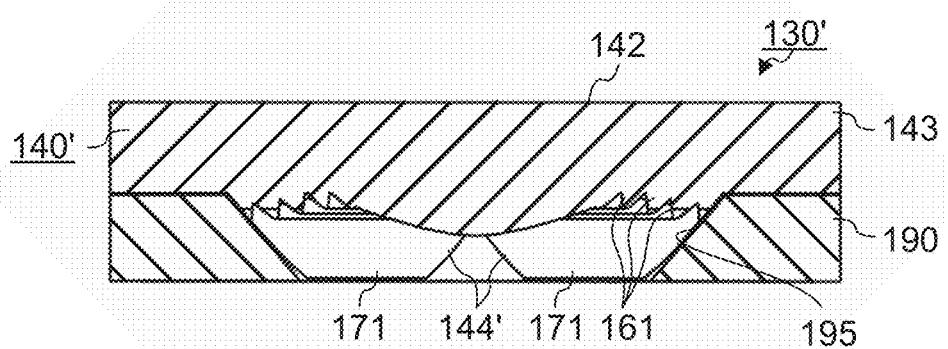

FIGS. 8A to 10B illustrate the configuration of comparative light flux controlling member 130'. FIG. 8A is a perspective view of light flux controlling member 130', and FIG. 8B is a perspective view of light flux controlling member body 140'. FIG. 9A is a plan view of light flux controlling member 130', FIG. 9B is a bottom view of light flux controlling member 130', FIG. 9C is a side view of light flux controlling member 130', FIG. 9D is a plan view of light flux controlling member body 140', FIG. 9E is a bottom view of light flux controlling member body 140', and FIG. 9F is a side view of light flux controlling member body 140'. FIG. 10A is a sectional view taken along line A-A in FIG. 9B, and FIG. 10B is a sectional view taken along line B-B in FIG. 9B.

Figure 8B:
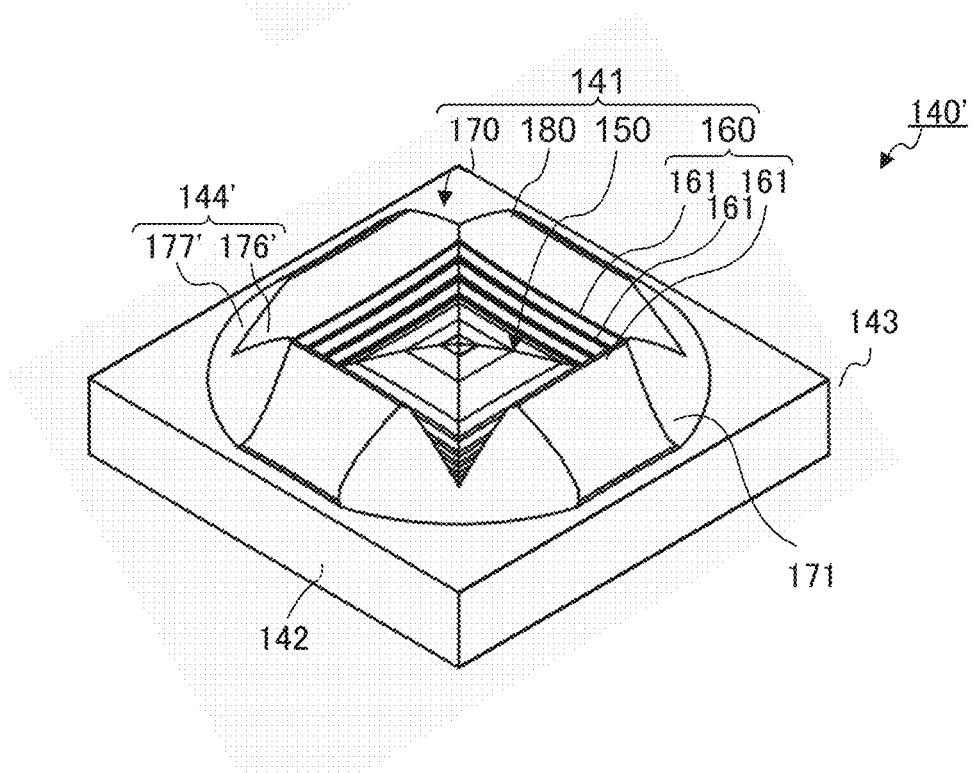
FIG. 8B is a perspective view of a comparative light flux controlling member body.
Figure 9A:
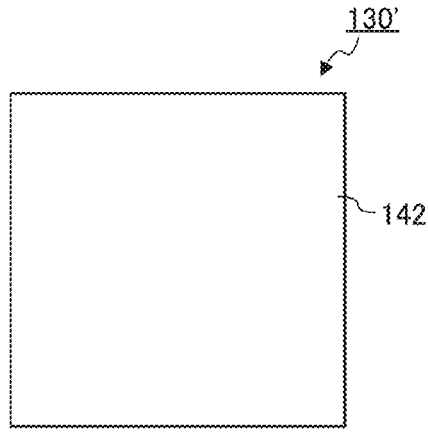
FIGS. 9A to 9C illustrate a configuration of the comparative light flux controlling member.
Figure 9D:
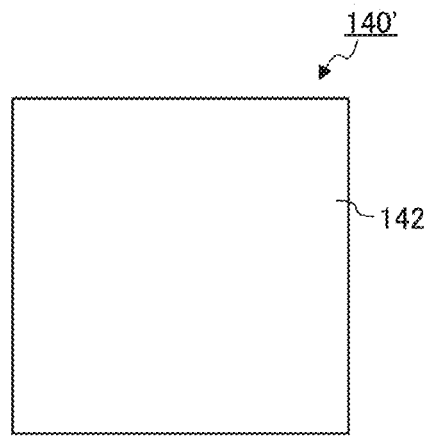
FIGS. 9D to 9F illustrate a configuration of the comparative light flux controlling member body.
Figure 9B:
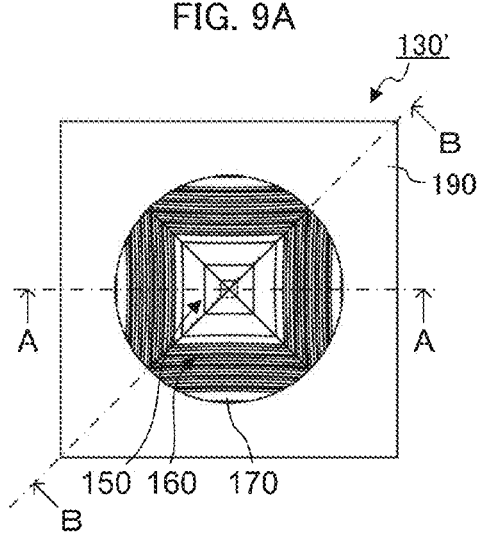
Figure 9E:
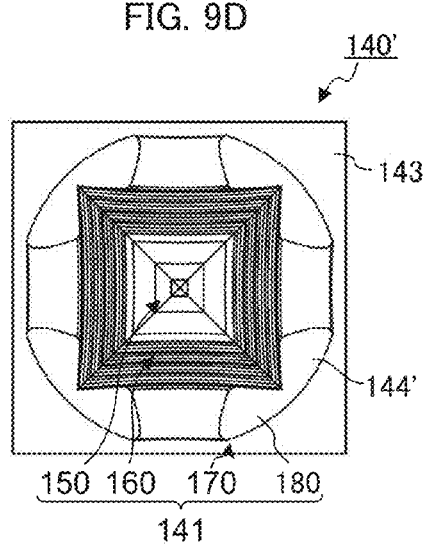
Figure 9C:
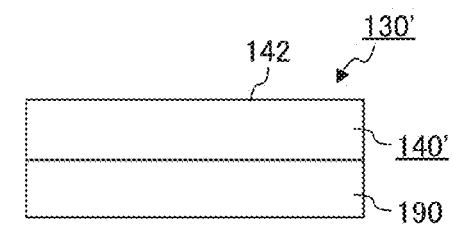
Figure 9F:
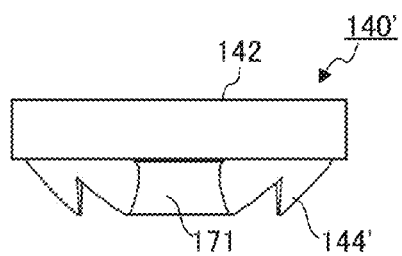

As illustrated in FIG. 8B, each of four corners 144' has third incidence surface 176' that receives a part of light emitted from light emitting element 120, and third reflection surface 177' that reflects the light having entered light flux controlling member body 140 through third incidence surface 176' toward emission area 142. Four corners 144' are disposed respectively at the four corners of second virtual quadrangle S2 to connect second reflection surfaces 173. That is, corners 144' have the functions similar to those of reflector 190, and can reflect light toward emission area 142. In addition, four corners 144' also function as reflector holding part 180. For example, corners 144' are formed integrally with light flux controlling member body 140' by injection molding.

Figure 11A:
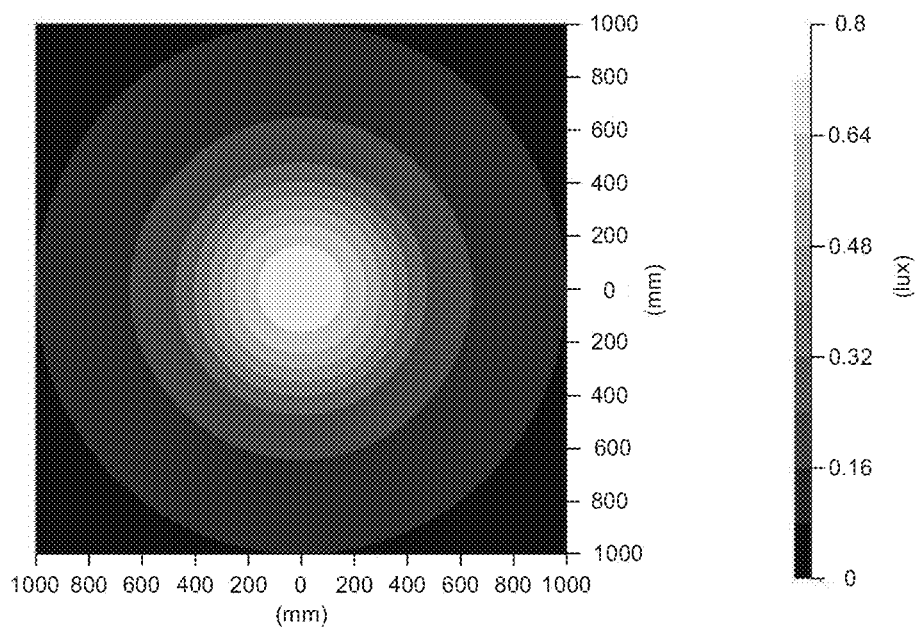
FIG. 11A illustrates simulation results of an illuminance distribution of a comparative light emitting device only having a light emitting element and a reflector.
Figure 11B:
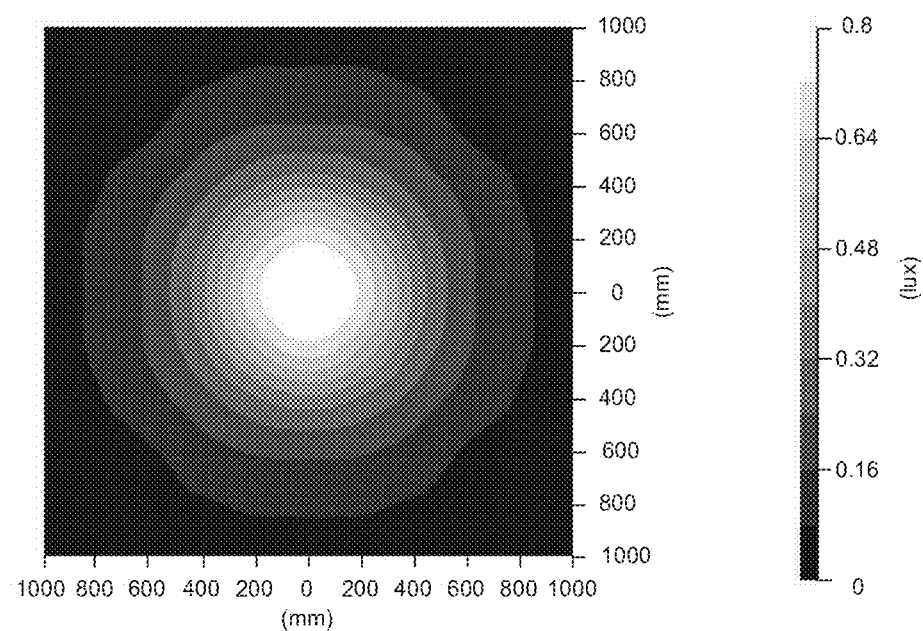
FIG. 11B illustrates simulation results of illuminance distribution of a comparative light emitting device having a comparative light flux controlling member.
Figure 12A:
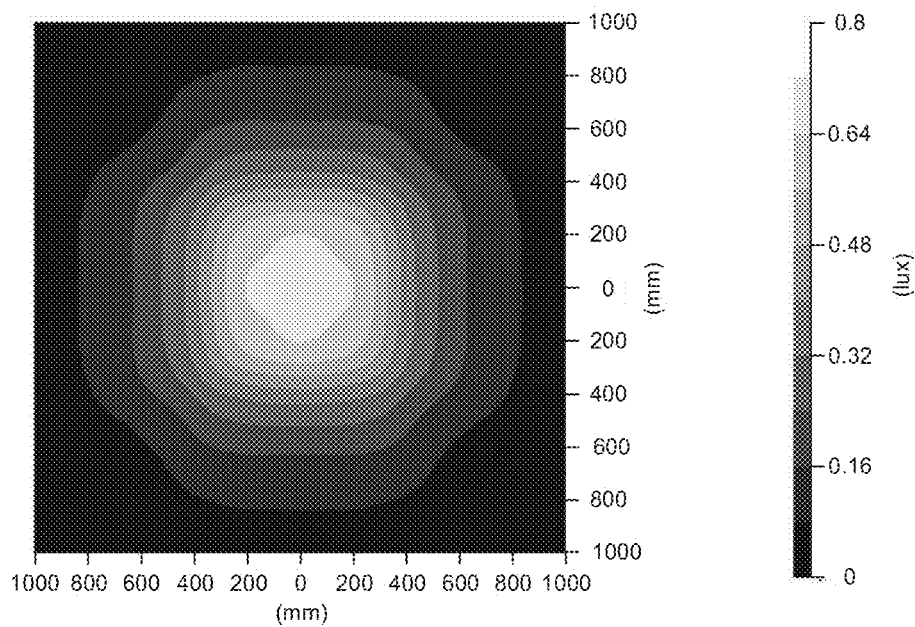
FIG. 12A illustrates simulation results of an illuminance distribution of a light emitting device having the light flux controlling member according to Embodiment 1.
Figure 12B:
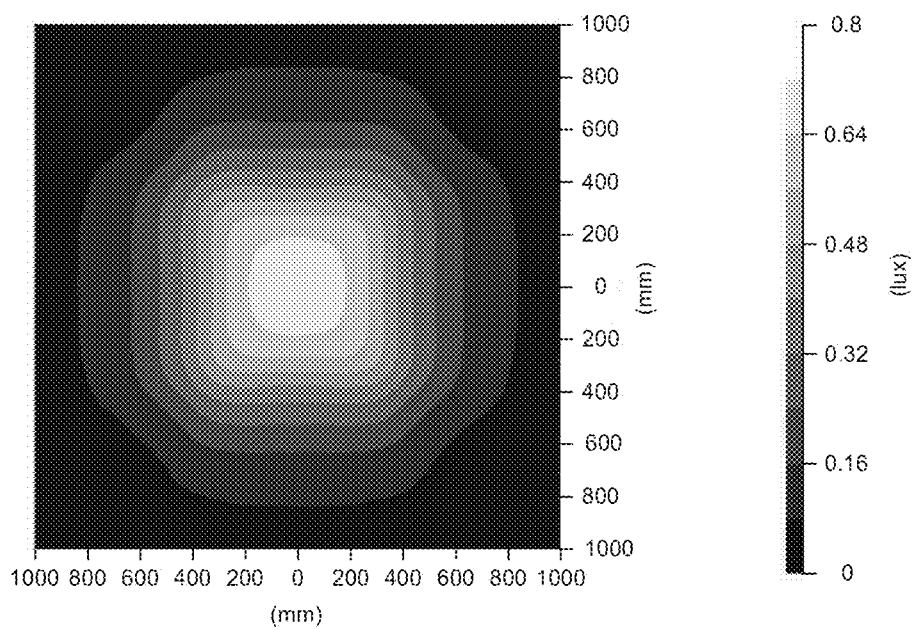
FIG. 12B illustrates simulation results of an illuminance distribution of the comparative light emitting device having the comparative light flux controlling member.

FIG. 11A illustrates simulation results of an illuminance distribution of a comparative light emitting device not having light flux controlling member body 140, and FIG. 11B illustrates simulation results of an illuminance distribution of a comparative light emitting device having a comparative light flux controlling member not including second protrusion 171. FIG. 12A illustrates simulation results of an illuminance distribution of light emitting device 100 having light flux controlling member 130 according to Embodiment 1, and FIG. 12B illustrates simulation results of an illuminance distribution of a comparative light emitting device having comparative light flux controlling member 130'. These diagrams illustrate simulation results of an illuminance distribution in an envisaged area to be irradiated that is 1,000 mm away from the light emitting surface of light emitting element 120. The ordinates and the abscissae in the left diagrams of FIGS. 11A, 11B, 12A and 12B indicate distance (mm) from optical axis OA of light emitting element 120. In addition, the ordinates in the right diagrams indicate illuminance (lux).

As illustrated in FIG. 11A, the comparative light emitting device not having light flux controlling member body 140 illuminated the area to be irradiated circularly. It can be found, from this result, that reflector 190 does not contribute to illuminating the area to be irradiated quadrangularly. In addition, as illustrated in FIG. 11B, the comparative light emitting device having the comparative light flux controlling member not including second protrusion 171 illuminated the area to be irradiated substantially circularly. It can be found, from this result, that only refraction part 150 and fresnel lens part 160 are not sufficient to illuminate the area to be irradiated quadrangularly.

In contrast, as illustrated in FIGS. 12A and 12B, light emitting device 100 having light flux controlling member 130 according to Embodiment 1 illuminated the area to be irradiated quadrangularly. Likewise, as illustrated in FIG. 12B, the comparative light emitting device having comparative light flux controlling member 130' further including four corners 144' also illuminated the area to be irradiated quadrangularly. It can be found, from this result, that second protrusions 171 greatly contribute to illuminating the area to be irradiated quadrangularly (see FIGS. 11B and 12A for comparison). It can also be found that, despite the fact that light flux controlling member 130 according to the present embodiment may be manufactured more easily than light flux controlling member 130' having corners 144' due to the lack of corners 144', light flux controlling member 130 has functions similar to those of light flux controlling member 130'.

(Configuration of Illumination Apparatus)

Next, illumination apparatus 400 having light emitting device 100 according to the present embodiment will be described.

Figure 13:
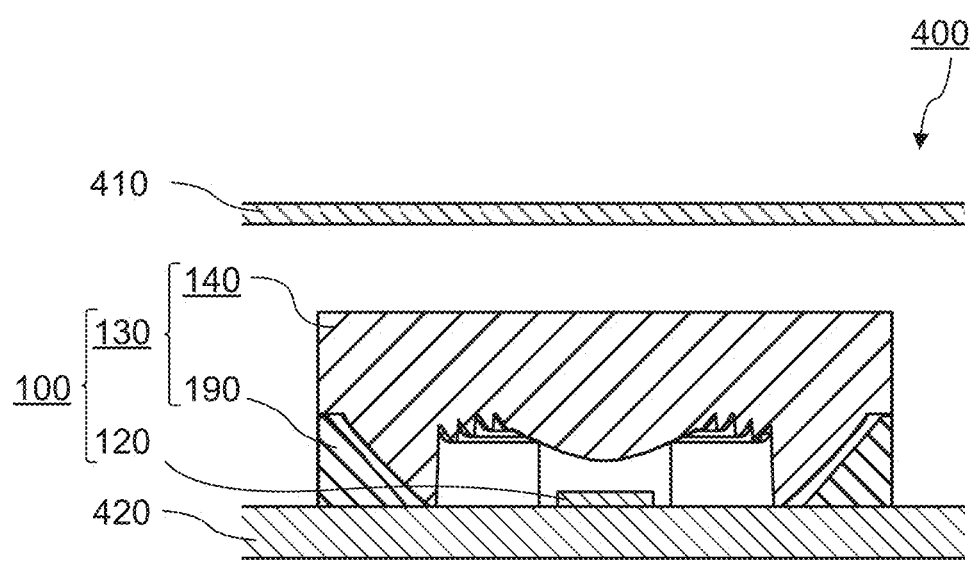
FIG. 13 illustrates a configuration of an illumination apparatus according to Embodiment 1.

FIG. 13 illustrates the configuration of illumination apparatus 400 according to the present embodiment. As illustrated in FIG. 13, illumination apparatus 400 includes light emitting device 100 and cover 410. As described above, light emitting device 100 includes light emitting element 120 and light flux controlling member 130. Light emitting element 120 is fixed to substrate 420.

Cover 410 transmits light emitted from light emitting device 100 while diffusing the emitted light, and protects light emitting device 100. Cover 410 is disposed on an optical path of light to be emitted from light emitting device 100. The material for cover 410 is not particularly limited insofar as cover 410 can exhibit the above-mentioned functions. Examples of the material for cover 410 include optically transparent resins such as polymethylmethacrylate (PMMA), polycarbonate (PC) and epoxy resin (EP), and glass.

(Effect)

As described above, light flux controlling member 130 according to the present embodiment is capable of irradiating the inside of a quadrangular area to be irradiated uniformly and efficiently with light emitted from light emitting element 120. In addition, despite the fact that light flux controlling member 130 according to the present embodiment may be manufactured more easily than light flux controlling member 130' having corners 144', light flux controlling member 130 has functions similar to those of light flux controlling member 130'. Light emitting device 100 and illumination apparatus 400 having light flux controlling member 130 according to the present embodiment is capable of illuminating a quadrangular area to be irradiated uniformly, thus allowing to enhance the efficiency in using light emitted from light emitting element 120, and concurrently to enhance the quality.

Embodiment 2

Light flux controlling member 230, a light emitting device and an illumination apparatus according to Embodiment 2 and light flux controlling member 130, light emitting device 100 and illumination apparatus 400 according to Embodiment 1 differ only in the shape of reflector 290 of light flux controlling member 230. Thus, the same components as those of light flux controlling member 130, light emitting device 100 and illumination apparatus 400 according to Embodiment 1 are indicated by the same reference signs, and the descriptions therefor will be omitted.

(Configuration of Light Flux Controlling Member)

Figure 14:
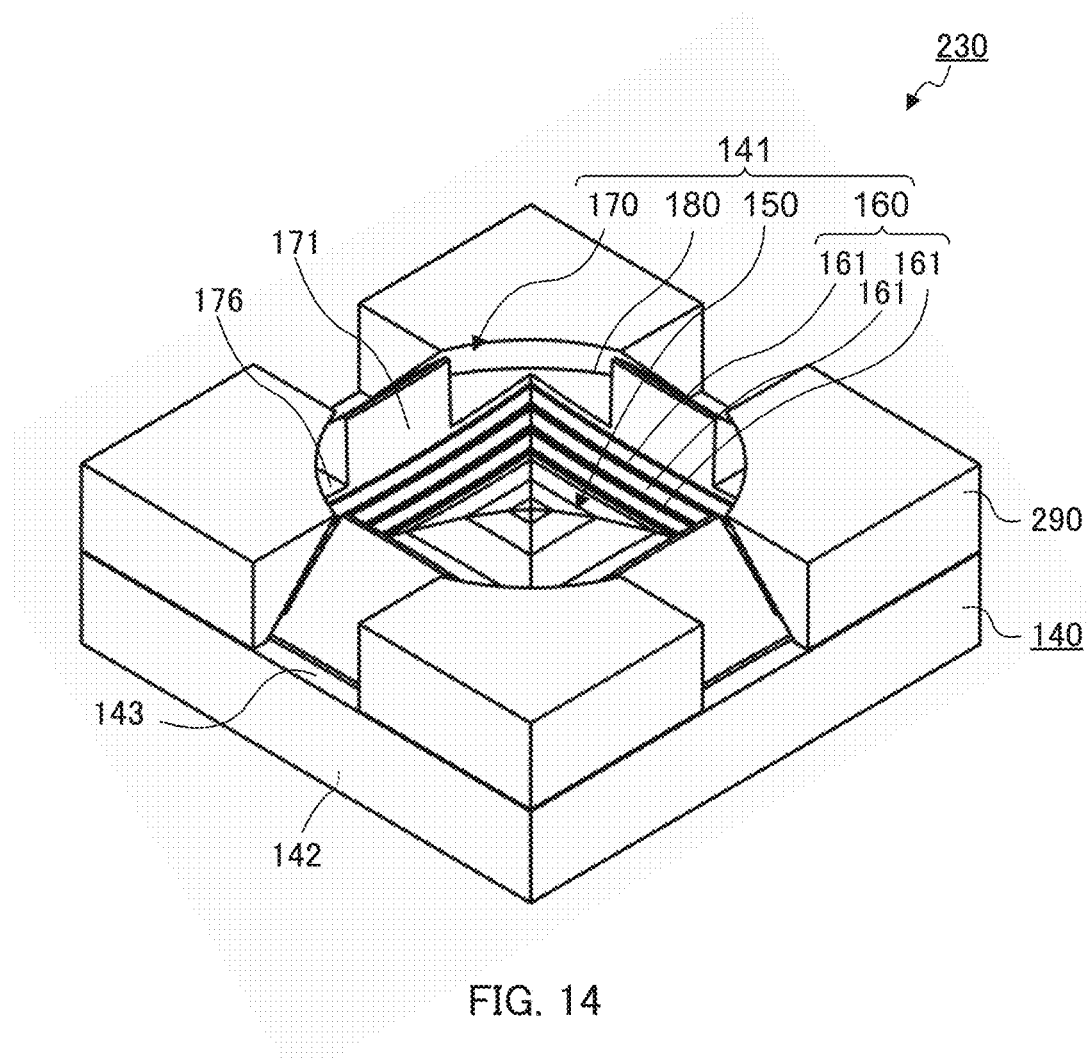
FIG. 14 is a perspective view of a light flux controlling member according to Embodiment 2.
Figure 15A:
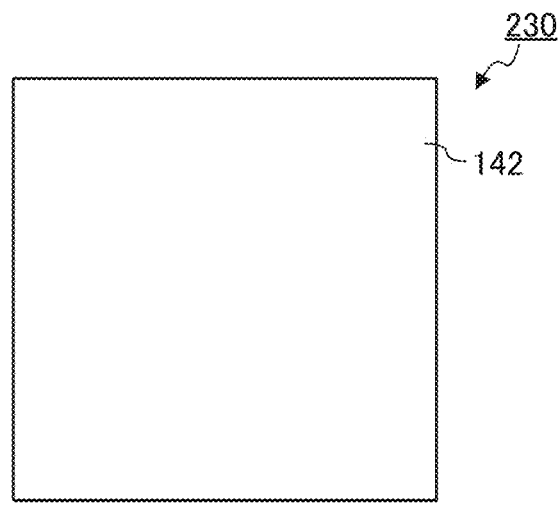
FIGS. 15A to 15C illustrate a configuration of the light flux controlling member according to Embodiment 2.
Figure 15B:
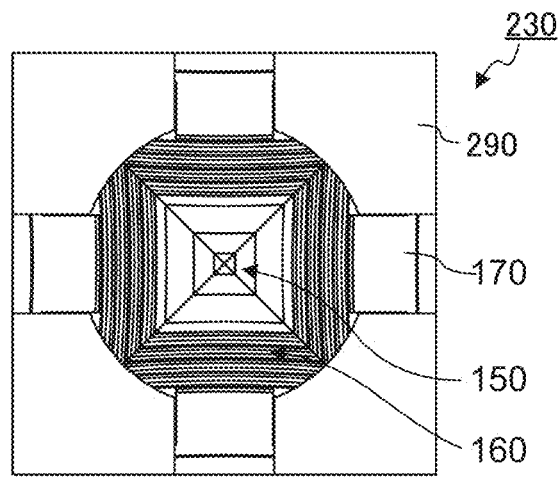
Figure 15C:
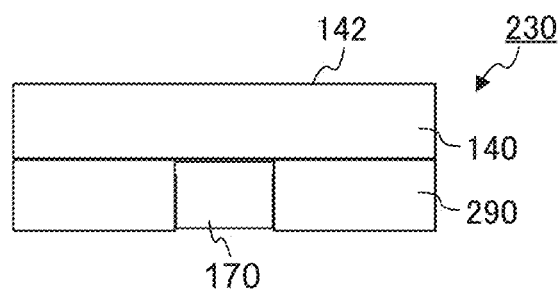

FIGS. 14, 15A, 15B and 15C illustrate the configuration of light flux controlling member 230 according to Embodiment 2. FIG. 14 is a perspective view of light flux controlling member 230 according to Embodiment 2 of the present invention. FIG. 15A is a plan view of light flux controlling member 230, FIG. 15B is a bottom view thereof, and FIG. 15C is a side view thereof. As illustrated in FIGS. 14, 15A, 15B and 15C, light flux controlling member 230 according to Embodiment 2 includes light flux controlling member body 140 and four reflectors 290.

Figure 16A:
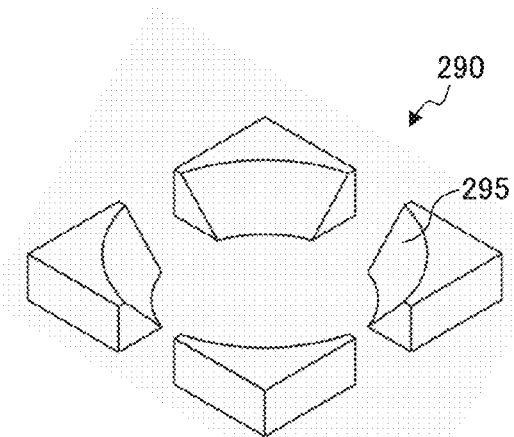
FIGS. 16A to 16F illustrate a configuration of a reflector according to Embodiment 2.
Figure 16D:
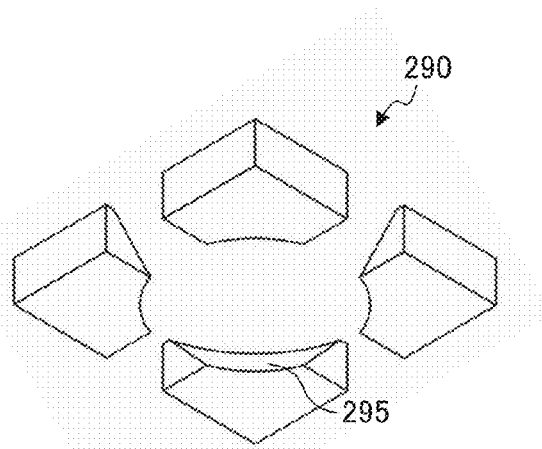
Figure 16B:
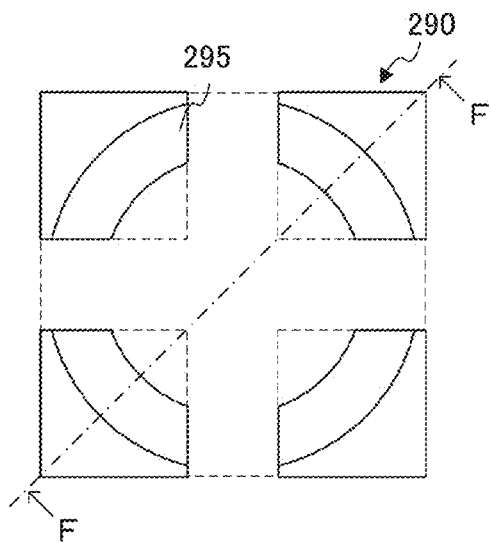
Figure 16E:
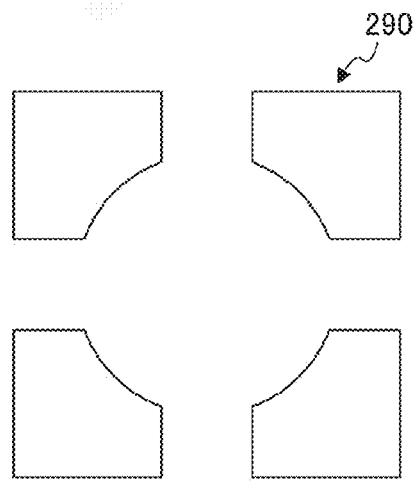
Figure 16C:
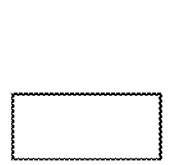
Figure 16F:
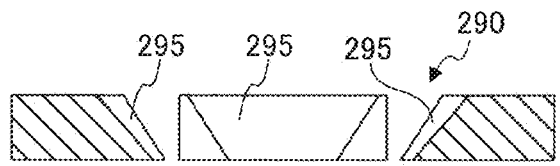

FIGS. 16A to 16F illustrate the configuration of reflector 290. FIG. 16A is a perspective view seen from above (from emission area 142), FIG. 16B is a plan view, FIG. 16C is a side view, FIG. 16D is a perspective view seen from below (from incidence area 141), FIG. 16E is a bottom view, and FIG. 16F is a sectional view taken along line F-F in FIG. 16B.

As illustrated in FIGS. 16A to 16F, each of four reflectors 290 has third reflection surface 295 that reflects a part of light other than light having entered light flux controlling member body 140 through incidence area 141 after having been emitted from light emitting element 120 toward emission area 142. Each of four reflectors 290 is held by reflector holding part 180 of light flux controlling member body 140 such that third reflection surfaces 295 are disposed at the respective four corners of second virtual quadrangle S2. Reflector 290 of the present embodiment corresponds to a part of reflector 190 of Embodiment 1. As described above, the shape of reflector 190 according to Embodiment 1 is a rectangle having a single through-hole. The shape of the through-hole is a truncated cone shape in which the diameter of the through-hole becomes continuously larger as being toward the opening on emission area 142 side away from the opening on incidence area 141 side. The inner surface of the through-hole of reflector 290 constitutes third reflection surface 295. As illustrated in FIG. 16B, four reflectors 290 according to the present embodiment may be formed by cutting reflector 190 according to Embodiment 1 in the vertical direction with a cross having a predetermined width. At that time, the width of the cross is the same as the length of second protrusion 171 in the extending direction of a side of second virtual quadrangle S2.

Descriptions for the material for reflector 290 and for the manufacturing method thereof are similar to those in Embodiment 1, and thus the descriptions therefor will be omitted.

(Effect)

Light flux controlling member 230, the light emitting device and the illumination apparatus according to Embodiment 2 have effects similar to those of light flux controlling member 130, light emitting device 100 and illumination apparatus 400 according to Embodiment 1.

It is noted that, while in the present embodiment descriptions have been given on the case where four reflectors 290 have the same shape and size, the respective reflectors may have different shapes and sizes when there are a plurality of reflectors.

In the above-described embodiments, descriptions have been given on light flux controlling members 130 and 230 having a step part as reflector holding part 180. However, it is sufficient that the reflector holding part according to the present invention can be disposed at the four corners of the second virtual quadrangle, and the reflector holding part is not limited to the above-described embodiments.

INDUSTRIAL APPLICABILITY

The light flux controlling member, the light emitting device and the illumination apparatus according to the present invention are capable of illuminating a quadrangular area to be irradiated uniformly and efficiently. The light emitting device according to the present invention is useful as a flash of a camera and the like, for example. Further, the illumination apparatus according to the present invention is useful as an ordinary indoor lighting, a surface light source apparatus of which surface to be irradiated is a liquid crystal panel, and the like, for example.

REFERENCE SIGNS LIST

10 Fresnel lens
12 Groove
20 Cylindrical lens
100 Light emitting device
120 Light emitting element
130, 130', 230 Light flux controlling member
140, 140' Light flux controlling member body
141 Incidence area
142 Emission area
143 Flange
144' Corner
150 Refraction part
160 Fresnel lens part
161 First protrusion
162 First incidence surface
163 First reflection surface
164 First connection surface
165 First ridge line
170 Outermost lens part
171 Second protrusion
172 Second incidence surface
173 Second reflection surface
174 Second connection surface
175 Second ridge line
176, 176' Third incidence surface
177' Third reflection surface
180 Reflector holding part
190, 290 Reflector
195, 295 Third reflection surface
400 Illumination apparatus
410 Cover
420 Substrate
L1 First diagonal line
L2 Second diagonal line
S1 First virtual quadrangle
S2 Second virtual quadrangle
O1 Center of first virtual quadrangle
O2 Center of second virtual quadrangle
CA Central axis
OA Optical axis

The invention claimed is:

1. A light flux controlling member that controls a distribution of light emitted from a light emitting element, comprising:
an incidence area configured to receive light emitted from the light emitting element; and
an emission area formed opposite to the incidence area and configured to emit light incident on the incidence area, wherein:
the incidence area includes:
a fresnel lens part including a plurality of first protrusions, each having a first incidence surface configured to receive a part of the light emitted from the light emitting element, a first reflection surface formed to make a pair with the first incidence surface and configured to reflect light incident on the first incidence surface toward the emission area, and a first ridge line disposed between the first incidence surface and the first reflection surface and configured to connect two adjacent diagonal lines of a first virtual quadrangle;
an outermost lens part including four second protrusions, each having a second incidence surface configured to receive another part of the light emitted from the light emitting element, and a second reflection surface formed to make a pair with the second incidence surface and configured to reflect light incident on the second incidence surface toward the emission area, each second protrusion being disposed on each side of a second virtual quadrangle disposed outside the first virtual quadrangle, and a third incidence surface disposed at each of four corners of the second virtual quadrangle and configured to receive a part of a rest of the light emitted from the light emitting element; and
a reflector holding part for holding reflectors disposed at least at four corners of the second virtual quadrangle,
the first virtual quadrangle and the second virtual quadrangle are disposed to be similar to and concentric with each other and to have their respective sides parallel to each other, and
the incidence area has 2-fold symmetry or 4-fold symmetry about a center of the first virtual quadrangle and the second virtual quadrangle, as a rotation axis.

2. The light flux controlling member according to claim 1, further comprising:
a reflector held by the reflector holding part and including a third reflection surface configured to reflect a part of light other than the light incident on the incidence area after being emitted from the light emitting element toward the emission area.

3. The light flux controlling member according to claim 2, wherein the reflector has a single third reflection surface disposed to surround an optical axis of the light emitting element outside the second reflection surface.

4. The light flux controlling member according to claim 3, wherein the single third reflection surface is circular in a cross-section orthogonal to the optical axis of the light emitting element.

5. The light flux controlling member according to claim 2, wherein the reflector has four third reflection surfaces disposed at respective four corners of the second virtual quadrangle.

6. The light flux controlling member according to claim 2, wherein a metal layer is disposed on the third reflection surface of the reflector.

7. The light flux controlling member according to claim 2, wherein the reflector is made of white resin.

8. A light emitting device comprising:
a light emitting element; and
the light flux controlling member according to claim 2, wherein:
the light flux controlling member is disposed such that a central axis of the light flux controlling member coincides with the optical axis of the light emitting element.

9. An illumination apparatus comprising:
the light emitting device according to claim 8, and
a cover configured to transmit light emitted from the light emitting device while diffusing the emitted light.

* * * * *